(12) United States Patent
Miyazaki

(10) Patent No.: US 10,168,564 B2
(45) Date of Patent: Jan. 1, 2019

(54) LIQUID CRYSTAL DISPLAY DEVICE

(71) Applicant: Mitsubishi Electric Corporation, Tokyo (JP)

(72) Inventor: Isamu Miyazaki, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/674,649

(22) Filed: Aug. 11, 2017

(65) Prior Publication Data

US 2018/0074360 A1 Mar. 15, 2018

(30) Foreign Application Priority Data

Sep. 9, 2016 (JP) .................................. 2016-176309

(51) Int. Cl.
  *G02F 1/1333* (2006.01)
(52) U.S. Cl.
  CPC .................. *G02F 1/133308* (2013.01); *G02F 2001/133311* (2013.01); *G02F 2001/133317* (2013.01); *G02F 2201/46* (2013.01); *G02F 2201/465* (2013.01)
(58) Field of Classification Search
  CPC .............................................. G02F 1/133308
  See application file for complete search history.

(56) References Cited

U.S. PATENT DOCUMENTS

| 2012/0188479 A1* | 7/2012 | Han | G02F 1/133308 349/58 |
| 2015/0293292 A1* | 10/2015 | Lee | G02B 6/0026 362/608 |
| 2017/0168345 A1* | 6/2017 | Wu | G02F 1/133308 |

FOREIGN PATENT DOCUMENTS

| JP | H09-197383 A | 7/1997 |
| JP | 2007-232812 A | 9/2007 |
| JP | 2012-008305 A | 1/2012 |

* cited by examiner

*Primary Examiner* — James Dudek
(74) *Attorney, Agent, or Firm* — Studebaker & Brackett PC

(57) ABSTRACT

It is an object to provide a liquid crystal display device capable of suppressing an abrasion of a first frame or a second frame due to a direct contact between the first frame and the second frame and an occurrence of shavings. A liquid crystal display device includes a rear frame being made of a metal and having a fitting claw, for being fitted with other component, which is formed by cutting and raising a part of a sidewall part from an upper end part side to project toward one surface side of the sidewall part, a middle frame being disposed to face an upper end part of the rear frame, and a relief part forming a clearance between a peripheral part of a base end of the fitting claw in the upper end part of the rear frame and a part of the middle frame facing the peripheral part.

20 Claims, 11 Drawing Sheets

LIQUID CRYSTAL DISPLAY DEVICE

FIELD OF THE INVENTION

The present invention relates to a liquid crystal display device including a housing constituted by combining and fitting a plurality of frames with each other to house a liquid crystal panel and various optical members, for example.

DESCRIPTION OF THE BACKGROUND ART

In a backlight unit for liquid crystal display included in a liquid crystal display device, a unit assembly is performed to assemble a middle frame and a rear frame by fitting a fitting hole provided in the middle frame with a narrowing part provided in the rear frame as a fitting claw for purpose of reducing a total number of components and improving an assembly operation. Herein, the middle frame is also referred to as a mold frame when it is formed by a resin molded using a mold.

As such a liquid crystal display device, Japanese Patent Application Laid-Open No. 2007-232812 discloses a configuration of fixing a pair of frames using an engaging protrusion and an engaging hole as a frame structure used for the liquid crystal device, for example. Particularly disclosed is a configuration that an upper end part of one frame in which the engaging protrusion is formed is in direct contact with a side surface of the other frame for purpose of preventing a backlash at the time of fixing the frames.

Japanese Patent Application Laid-Open No. 2012-008305 discloses a configuration of fixing a pair of frames using an engaging protrusion and an engaging hole as a frame structure used for the liquid crystal device in a manner similar to Japanese Patent Application Laid-Open No. 2007-232812. Japanese Patent Application Laid-Open No. 2012-008305 discloses a configuration that the upper end part of the frame in which the engaging protrusion is formed is not in direct contact with the other frame, differing from the case of Japanese Patent Application Laid-Open No. 2007-232812, but is wholly separated from each other in a state where the engaging protrusion and an engaging hole engage with each other, Japanese Patent Application Laid-Open No. H09-197383 discloses a configuration of a liquid crystal display device that a positioning protrusion is provided in an upper end part of a shield case housing part as a frame in which a protrusion for preventing the frame from falling off is formed. The positioning protrusion is provided to engage with and be fixed to a positioning engaging hole provided in a shield case cover which is an external frame formed by combining the frames.

SUMMARY

However, according to the above configuration, when a narrowing process is performed in a narrowing part of the rear frame, a power is locally added, and an unintended minute deformation, that is to say, a projecting portion occurs near the narrowing part, specifically, in a peripheral part of a base end of the fitting claw in the upper end part of a sidewall part of the rear frame when the fitting claw is provided in the sidewall part of the rear frame. There arises a problem that the unintended projecting portion comes strongly in contact with the middle frame due to an influence of an oscillation or impact, for example, after fitting the middle frame with the rear frame, and the middle frame or the projecting portion is abraded, thereby causing shavings.

Although there is no specific description of a method of forming the engaging protrusion in the configuration described in Japanese Patent Application Laid-Open No. 2007-232812, for example, when the engaging protrusion is formed by the narrowing process, the projecting portion comes in direct contact with the other frame, thereby causing shavings in a portion where the upper end part of the frame, in which the engaging protrusion is formed, is in direct contact with the side surface of the other frame.

There arises a problem in the configuration described in Japanese Patent Application Laid-Open No. 2012-008305 that a backlash occurs even when the two frames are combined with each other by reason that the upper end part of the frame and the other frame are not fixed to each other with respect to a movement in a direction that they are in direct contact with each other. Furthermore, also assumed is a case where the upper end part of the frame in which the engaging protrusion is formed comes in direct contact with the other frame depending on a degree of backlash. In the above case, the projecting portion comes in direct contact with the other frame, thereby causing shavings.

Since a method of forming the protrusion for preventing the frame from falling off and a degree of proximity between a sidewall part of the shield case housing part and a sidewall part of the shield case cover, for example, are unclear in Japanese Patent Application Laid-Open No. 1109-197383, it is also unclear whether or not an unintended projecting portion occurs in a peripheral part of a base end of the protrusion for preventing the frame from falling off in the sidewall part of the shield case housing part. However, Japanese Patent Application Laid-Open No. H09-197383 does not describe and suggest the problem that the unintended projecting portion occurs in the sidewall part of the shield case housing part, and the projecting portion comes in direct contact with the frame located to face the projecting portion, thereby causing a foreign particle, so that it does not disclose an effective solution for the above problem.

It is an object of the present invention to provide a liquid crystal display device capable of suppressing an abrasion of a first frame or a second frame due to a direct contact between the first frame and the second frame and an occurrence of shavings.

A liquid crystal display device according to the present invention includes a first frame, a second frame, and a relief part. The first frame is made of a metal and having a fitting claw, for being fitted with other frame, which is formed by cutting and raising a part of a sidewall part from an upper end part side to project toward one surface side of the sidewall part. The second frame is disposed to face an upper end part of the first frame. The relief part forms a clearance between a peripheral part of a base end part of the fitting claw in the upper end part of the first frame and a part of the second frame facing the peripheral part.

The liquid crystal display device includes the relief part forming the clearance between the peripheral part of the base end of the fitting claw in the upper end part of the first frame and the part of the second frame facing the peripheral part.

Accordingly, even when a projecting portion projecting toward the second frame side occurs in the peripheral part of the base end of the fitting claw in the upper end part of the first frame, the direct contact of the projecting portion with the second frame can be suppressed. Since the direct contact of the projecting portion with the second frame due to an influence of an oscillation or impact, for example, is suppressed, an abrasion of the projecting portion of the first frame or the second frame and the occurrence of shavings can be suppressed.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

The embodiment 1 of the present invention is described hereinafter using drawings. Firstly, a whole configuration of a liquid crystal display device 100 is described.

<Whole Configuration of the Liquid Crystal Display Device>

Figure 1:
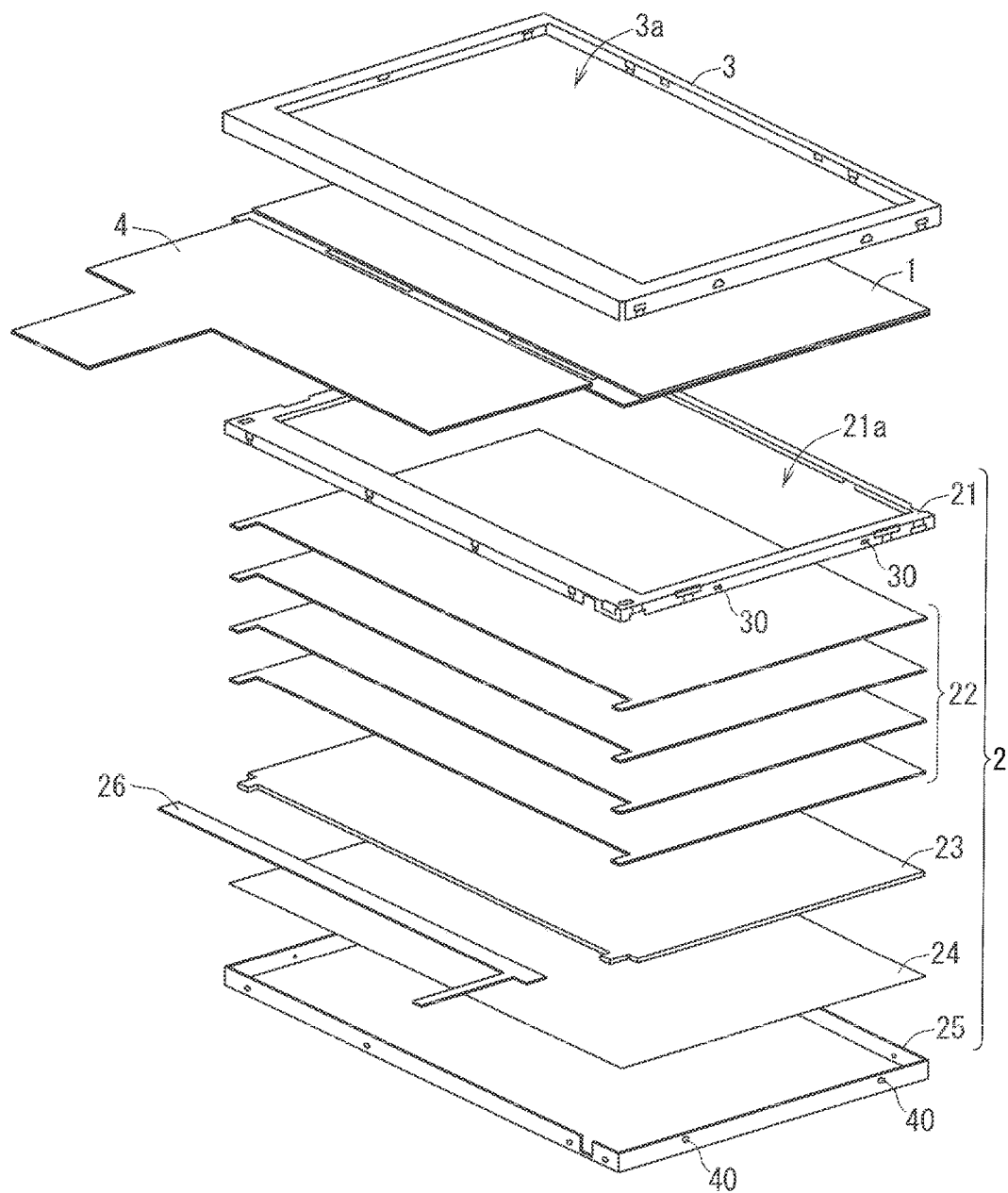
FIG. 1 is an exploded perspective view of a liquid crystal display device according to an embodiment 1.

FIG. 1 is an exploded perspective view of the liquid crystal display device 100 according to the embodiment 1. As illustrated in FIG. 1, the liquid crystal display device 100 includes a liquid crystal display panel 1, a backlight 2, a front frame 3, and a circuit substrate 4. The backlight 2 is a member to irradiate the liquid crystal display panel 1 from a back surface of the liquid crystal display panel 1. The front frame 3 has an opening part 3a, and the liquid crystal display panel 1 and the backlight 2 are disposed inside the front frame 3. A touch panel (not shown) for inputting a positional signal to a screen from outside is provided on a front surface of the liquid crystal display panel 1 via a transparent adhesive sheet (not shown) provided to attach the touch panel, in some cases. Furthermore, a cover (not shown) for protecting the circuit substrate 4 is provided on a rear surface of the liquid crystal display panel 1. Next, each member constituting the liquid crystal display device 100 is described.

<Liquid Crystal Display Panel>

Figure 2:
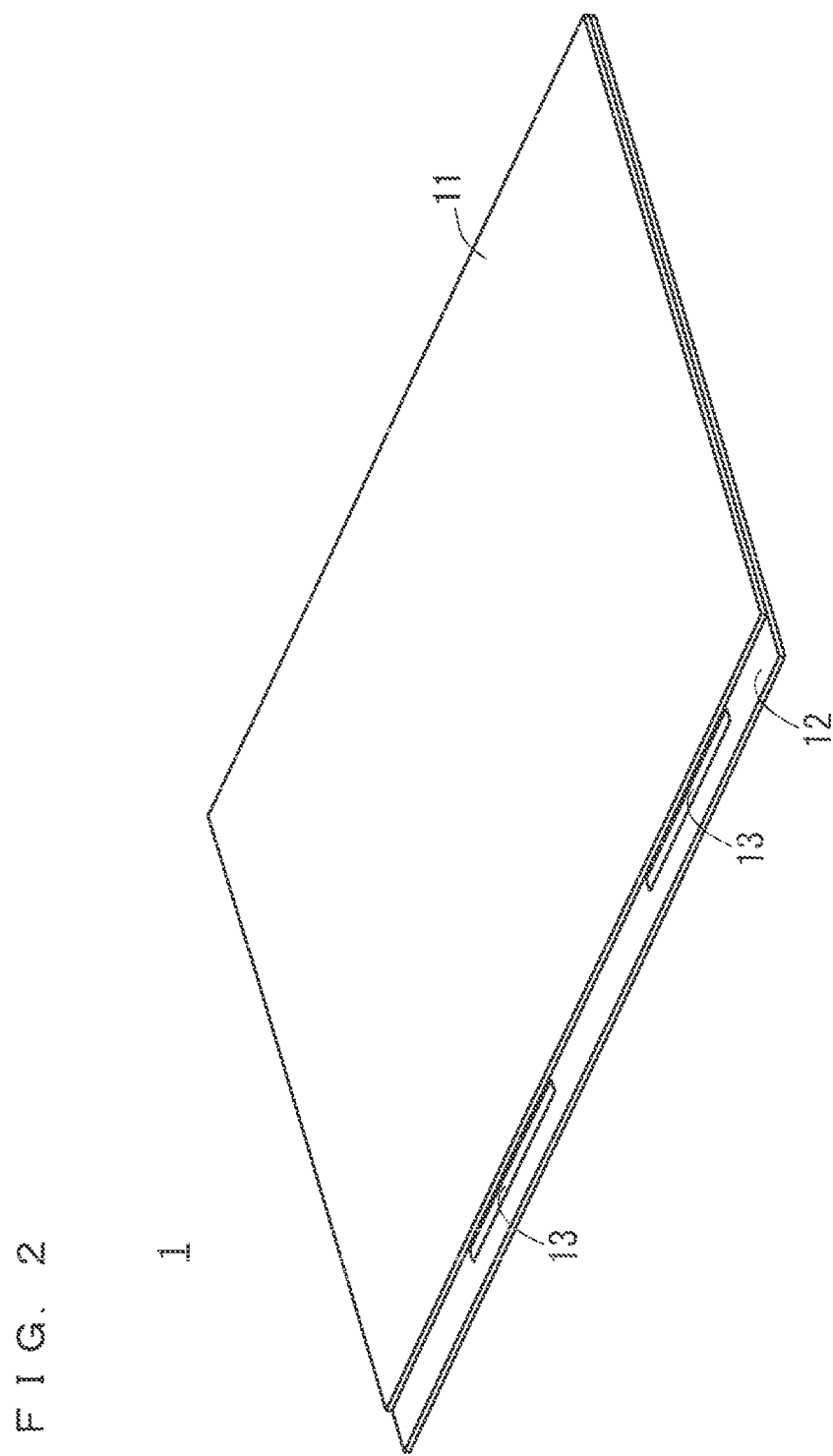
FIG. 2 is a perspective view of a liquid crystal display panel.

FIG. 2 is a perspective view of the liquid crystal display panel 1. As illustrated in FIG. 2, the liquid crystal display panel 1 is made up of a transmissive or semi-transmissive liquid crystal display panel, for example. The liquid crystal display panel 1 applies birefringence of a liquid crystal, and includes a color filter substrate 11 in which a color filter (CF), a light shielding layer, and an opposite electrode, for example, are formed on an insulating substrate such as a glass and a thin film transistor substrate 12 in which a thin film transistor (TFT) which serves as a switching element and a pixel electrode, for example, are formed on an insulating substrate such as a glass.

The liquid crystal display panel 1 also includes a spacer for retaining an interval between the color filter substrate 11 and the thin film transistor substrate 12, a sealing member for attaching the color filter substrate 11 to the thin film transistor substrate 12, a sealing material for sealing an inlet to inject a liquid crystal sandwiched between the substrates 11 and 12, an alignment film for aligning the liquid crystal, a polarization plate disposed on an outer side surface of the substrates 11 and 12, a driving IC 13 disposed on an outer peripheral part of the thin film transistor substrate 12 or on a tape-like wiring material connected to an outer peripheral part of the thin film transistor substrate 12, for example. The tape-like wiring material is tape carrier package (TCP) or chip on film (COF), for example.

<Backlight>

As illustrated in FIG. 1, the backlight 2 includes a light source substrate 26 having a light source to emit light, a light guide plate 23 which has an outputting surface causing the light being output from the light source to enter from a side surface to propagate to a front surface and an opposite outputting surface located on opposite side of the outputting surface, an optical sheet 22 disposed on the outputting surface of the light guide plate 23 to control a distribution and spread of the light being output from the light guide plate 23, a reflection plate 24 which orients the light toward the light guide plate 23 through the opposite outputting surface of the light guide plate 23, a rear frame 25 as a first frame for holding the above members, and a middle frame 21 as a second frame to mount the liquid crystal display panel 1. The backlight 2 irradiates the liquid crystal display panel 1 from a side of the thin film transistor substrate 12 located on opposite side of a display surface.

<Light Guide Plate>

The light guide plate 23 is made of a transparent acrylic resin, polycarbonate resin, or glass, for example, and has a diffusion dot pattern or a prism shape on the opposite outputting surface or the outputting surface of the light guide plate 23 to output the light and adjust an intensity distribution and an outputting direction of the light in the surface. The light guide plate 23 is fixed to the rear frame 25 with a double-faced tape, for example, in some cases.

<Optical Sheet>

Furthermore, the optical sheet 22 is disposed on the light guide plate 23 to adjust an intensity distribution and output angle of the output light. A plurality of lens sheets for collecting the light, diffusion sheets for uniformizing the light, or view angle adjusting sheets for adjusting a brightness in a view angle direction are disposed as the optical sheets 22 in accordance with a purpose. A resin material such as polycarbonate (PC) or poly ethyrene terephthalate (PET), for example, is used as a material of the optical sheet 22.

<Middle Frame>

The middle frame 21 is formed to have a frame shape having an opening part 21a for outputting the light from the outputting surface of the light guide plate 23. The liquid crystal display panel 1 is aligned and held on an upper surface side of the middle frame 21. A metal such as aluminum, stainless, or iron or a resin material such as polycarbonate (PC) or acrylonitrile butadiene styrene (ABS), for example, can be used as a material of the middle frame 21. The middle frame 21 is also referred to as a mold frame when it is formed by a resin material molded using a mold.

<Rear Frame>

It is preferable to use a metal frame made of a metal having a high heat conductivity as the rear frame 25 to conduct heat radiated from the light source When the heat from the light source is efficiently radiated by using aluminum or aluminum alloy housing having particularly the high heat conductivity, the heat can be prevented from staying in the backlight 2.

The middle frame 21 and the rear frame 25 are fixed to each other by fitting particularly a fitting claw 40 provided in the rear frame 25 with a fitting hole 30 provided in the middle frame 21. Accordingly, the middle frame 21 and the rear frame 25 house the members constituting the backlight 2 (referred to as "the backlight member" hereinafter) therein, and hold the liquid crystal display panel 1 and the circuit substrate 4, for example, on an upper surface side of the middle frame 21. Herein, the backlight member includes the light source, the optical sheet 22, the light guide plate 23, and the reflection plate 24. A structure in a peripheral part of the fitting claw 40 provided in the rear frame 25 and a structure in a peripheral part of the fitting hole 30 provided in the middle frame 21 are described in detail separately, so that the detailed description is omitted here.

<Light Source>

A point light source of RGB, an LED having an emission color other than RGB, or a fluorescent lamp (not shown) is disposed as the light source. When the point light source is used, a substrate applying a general glass epoxy resin as a base or a flexible flat cable may be used as the light source substrate 26 mounting the point light source, or a substrate applying a metal such as aluminum or ceramic as a base may also be used to enhance heat radiation. The light source substrate 26 is attached to and held by the light guide plate 23 or the rear frame 25, for example. Herein, RGB indicates three primary colors of light made by red, green, and blue.

In the configuration of the backlight described above, the middle frame 21 and the rear frame 25, and the backlight member housed in these frames, that is to say, the light source, the light guide plate 23, the optical sheet 22, and the reflection plate 24 are collectively referred to as the backlight 2. However, it is also applicable to add a frame different from the middle frame 21 and locate the backlight 2, which has the configuration that the backlight member, that is to say, the light source and the light guide plate 23 are housed in the added frame and the rear frame 25, on the back side of the middle frame 21 with the optical sheet 22 therebetween.

<Front Frame>

The front frame 3 is a frame-like member for holding the liquid crystal display panel 1 and the backlight 2. The front frame 3 is made of a thin plate metal or a resin molding, for example, and is fixed to the backlight 2 with a claw-like fixing structure or a screw, for example. The front frame 3 may be integrally formed, or may also be made by combining a plurality of members. An attachment part to be attached to an end product may be provided in a side surface, a front surface, a back surface, or a peripheral part of the front frame 3. Herein, the attachment part is a screw hole or an attachment hole, for example.

<Circuit Substrate>

In the circuit substrate 4, an electrical component is normally mounted on FPC (Flexible Printed Circuits) in which a wiring is formed in a base material on a film connected to the liquid crystal panel 1 so that the liquid crystal panel 1 and the light source are controlled by an electrical input-output signal. However, also applicable as the circuit substrate 4 is a configuration that a copper pattern is formed in a glass epoxy, for example, and a substrate which mounts an electronic component on a surface with solder is mainly disposed in and fixed to a rear surface side of the liquid crystal display device 100. Herein, the rear surface side of the liquid crystal display device 100 indicates a side from which the light is not output.

A protection cover (not shown) made of a metal such as aluminum, stainless, or a galvanized steel sheet or a thin film resin such as PET (Polyethylene terephthalate) may be attached to protect the circuit substrate 4 from a pressure from outside and static electricity. When a metal protection cover is used, it is preferable to attach a resin sheet such as PET on a side of the circuit substrate 4 to avoid an electrical contact between the circuit substrate 4 and the electrical component on the circuit substrate 4 for insulation.

<Structure of the Peripheral Part of the Fitting Claw and Fitting Hole>

Figure 13:
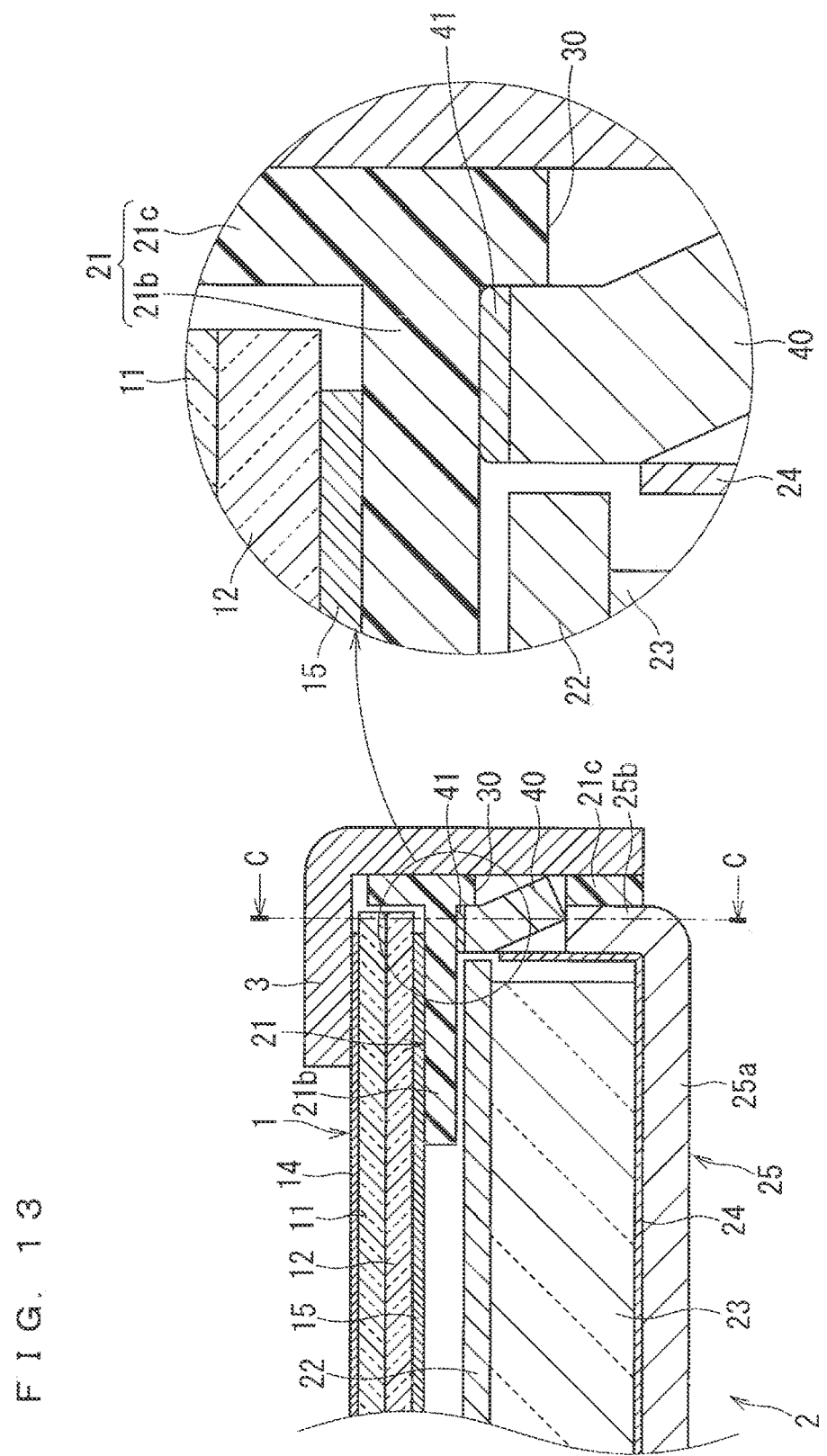
FIG. 13 is a partial cross sectional view of a liquid crystal display device according to a premise technique and its enlarged view.
Figure 14:
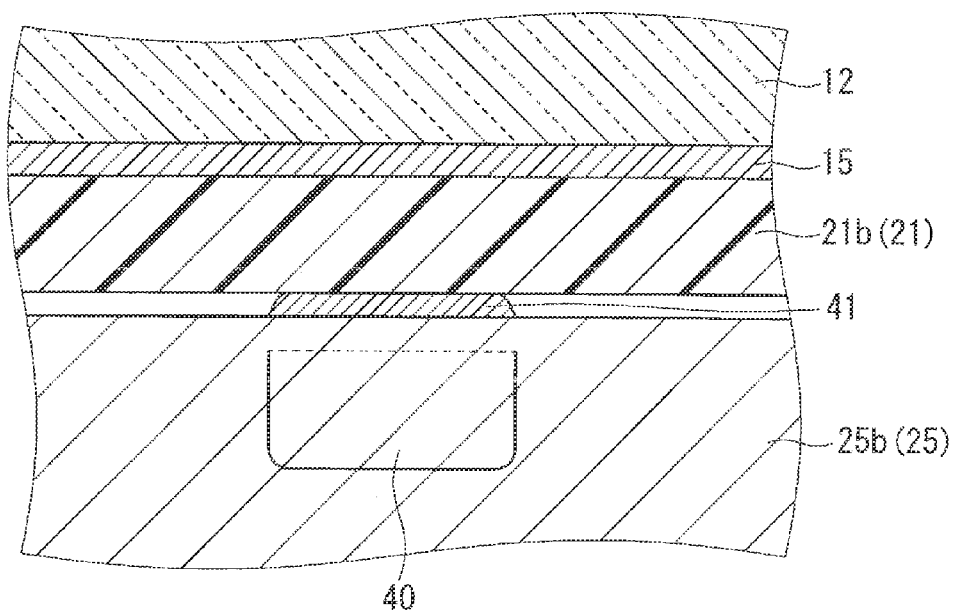
FIG. 14 is a cross sectional view along a C-C line of FIG. 13.

Next, the structure of the peripheral part of the fitting claw 40 and the fitting hole 30 is described. Firstly, a structure of a peripheral part of the fitting claw 40 and the fitting hole 30 in a liquid crystal display device 200 according to a premise technique is described. FIG. 13 is a partial cross sectional view of the liquid crystal display device 200 according to the premise technique and its enlarged view, and is a drawing schematically illustrating the partial cross section of the liquid crystal display device 200. FIG. 14 is a cross sectional view along a C-C line of FIG. 13.

As illustrated in FIG. 13 and FIG. 14, the front frame 3, the liquid crystal display panel 1, the middle frame 21, the optical sheet 22, the light guide plate 23, the reflection plate 24, and the rear frame 25 are disposed in this order from a side of a display surface of the liquid crystal display device 200. In the liquid crystal display panel 1, the liquid crystal (not shown) is injected and sealed between the color filter substrate 11 and the thin film transistor substrate 12. A polarization plate 14 is attached to a surface of the color filter substrate 11 and a polarization plate 15 is attached to a surface of the thin film transistor substrate 12. An integrated circuit (not shown), a TCP, and a control substrate, for example, are connected to a circuit terminal part (not shown) on the thin film transistor substrate 12, thereby constituting the liquid crystal display panel 1. The rear frame 25 houses the optical sheet 22, the light guide plate 23, the reflection plate 24, and the light source substrate 26 (refer to FIG. 1), for example, and the middle frame 21 and the rear frame 25 are fitted and combined with each other, thereby constituting the backlight 2.

The rear frame 25 includes a bottom wall part 25a, a sidewall part 25b erected from a peripheral edge part of the bottom wall part 25a toward the front frame 3, and the fitting claw 40 to be fitted with the other component. More specifically, the fitting claw 40 is a claw to be fitted with the component other than the rear frame 25, and is provided to be fitted with the middle frame 21 in the case of FIG. 13. The fitting claw 40 is provided to project toward one surface side of the sidewall part 25b, that is to say, an outside surface side of the sidewall part 25b in a state where part of the sidewall part 25b is cut and raised from an upper end part side of the sidewall part 25b. The two fitting claws 40 are provided in two sides, respectively, of four sides constituting the sidewall part 25b, for example.

The middle frame 21 is disposed to face the upper end part of the sidewall part 25b of the rear frame 25. The middle frame 21 includes an upper wall part 21b having a frame shape, a sidewall part 21c erected from a peripheral edge part of the upper wall part 21b toward the front frame 3 and rear frame 25, and the fitting hole 30 fitted with the fitting claw 40. In the sidewall part 21c, the part erected toward the rear frame 25 is longer than the part erected toward the front frame 3, and the fitting hole 30 is provided in the side of the rear frame 25 of the sidewall part 21c corresponding to the fitting claw 40. That is to say, the two fitting holes 30 are provided in two sides, respectively, of four sides constituting the sidewall part 21c. In many cases, a mold frame mainly formed of a resin material such as polycarbonate, for example, is used as the middle frame 21, and a metal frame mainly formed of a metal material such as aluminum, for example, is used as the rear frame 25. In the embodiment 1, a mold frame formed of a resin material is used as the middle frame 21, and a metal frame formed of a metal material is used as the rear frame 25.

As described above, the fitting claw 40 is formed by cutting and raising the part of the sidewall part 25b from the upper end part side of the sidewall part 25b. That is to say, the fitting claw 40 is formed by performing a narrowing process on the part of the sidewall part 25b. As described above, the narrowing process is performed on the part of the sidewall part 25b, thereby causing an undesired, that is to say, an unintended process distortion in design in the peripheral part of the base end of the fitting claw 40, and a projecting portion 41 slightly projecting toward the middle frame 21 is formed in some cases.

Particularly, as illustrated in FIG. 13 and FIG. 14, when the fitting claw 40 is formed in a position relatively close to the upper end part of the sidewall part 25b of the rear frame 25, the projecting portion 41 is remarkably formed. In the above state, when the backlight 2 is made by fitting the fitting hole 30 with the fitting claw 40 provided in the middle frame 21 and the rear frame 25, respectively, a defect of a partially direct contact between the projecting portion 41 formed by the unintended process distortion and part of the middle frame 21 facing the projecting portion 41 occurs. When the projecting portion 41 and the middle frame 21 are partially in direct contact with each other, there arises a problem that the direct contact areas come strongly in contact with each other due to an influence of an oscillation or impact in manufacturing the liquid crystal display device 100 or in using the product, for example, and the middle frame 21 or the projecting portion 41 is abraded, thereby causing shavings. The upper end part of the sidewall part 25b of the rear frame 25 is the upper end part of the rear frame 25. The upper end part of the sidewall part 25b of the rear frame 25 is also referred to as the upper end part of the rear frame 25 hereinafter.

When a foreign particle caused by the abrasion moves to the display surface of the liquid crystal display device 100, it causes a production disturbance that the foreign particle is visually recognized as a display defect or a rework operation for removing the foreign particle is necessary, for example. Particularly, it is difficult to find the problem that the foreign particle caused by the abrasion moves to the display surface of the liquid crystal display device 100, thereby causing the display defect in the completed liquid crystal display device 100, on an examination, for example. Thus, the foreign particle may move due to the oscillation in transferring or using the liquid crystal display device 100 and cause the display defect at a customer or end user side, thereby causing an important problem relating to a quality of the product.

Figure 3:
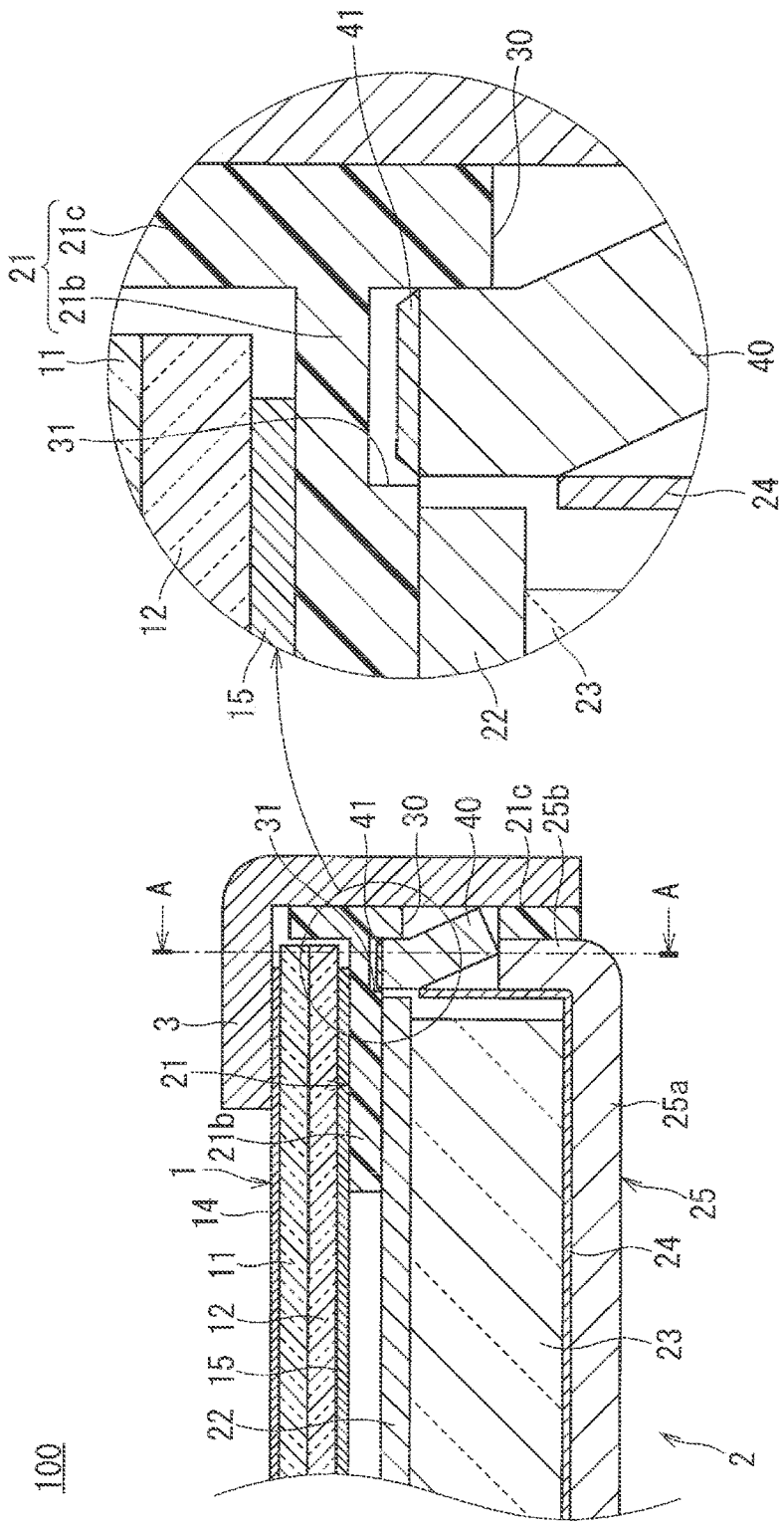
FIG. 3 is a partial cross sectional view of the liquid crystal display device according to the embodiment 1 and its enlarged view.
Figure 4:
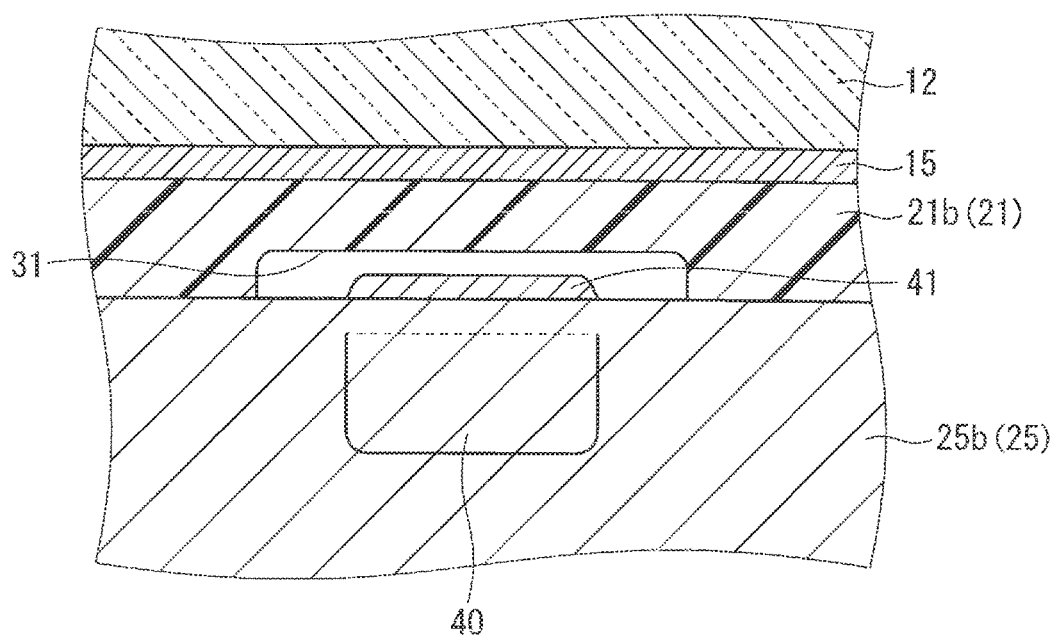
FIG. 4 is a cross sectional view along an A-A line of FIG. 3.

Next, a structure of a peripheral part of the fitting claw 40 and the fitting hole 30 in the liquid crystal display device 100 according to the embodiment 1 is described. FIG. 3 is a partial cross sectional view of the liquid crystal display device 100 according to the embodiment 1 and its enlarged view, and is a drawing schematically illustrating the partial cross section of the liquid crystal display device 100. FIG. 4 is a cross sectional view along an A-A line of FIG. 3.

As illustrated in FIG. 3 and FIG. 4, the structure of the peripheral part of the fitting claw 40 and the fitting hole 30 in the liquid crystal display device 100 is basically the same as that of the liquid crystal display device 200 illustrated in FIG. 13 and FIG. 14. Thus, the same reference numerals as those described in the premise technique will be assigned to the same constituent element and the description thereof will be omitted, and only a point of difference is described.

As illustrated in FIG. 3 and FIG. 4, in the embodiment 1, a concave portion 31 is provided in the upper wall part 21b of the middle frame 21 facing the peripheral part of the base end of the fitting claw 40. That is to say, the concave portion 31 is formed in the part of the middle frame 21 facing the part where the projecting portion 41 is formed so as to dent on an opposite side of the rear frame 25. Accordingly, the concave portion 31 functions as a relief part forming a clearance between the peripheral part of the base end of the fitting claw 40 in the upper end part of the sidewall part 25b of the rear frame 25 and the part of the middle frame 21 facing the peripheral part. Such a formation of the clearance enables an increase in a distance between the middle frame 21 and the projecting portion 41. A depth of the concave portion 31 is formed larger than a projection amount of the projecting portion 41 from the base end to a tip thereof. The concave portion 31 is formed in a region wider than a region where the projecting portion 41 is formed.

Considered herein is a case where the fitting hole 30 and the fitting claw 40 provided in the middle frame 21 and the rear frame 25, respectively, are fitted with each other to constitute the backlight 2. Since the concave portion 31 is provided in the middle frame 21 as the relief part, the part of the middle frame 21 facing the upper end part of the rear frame 25 does not come in direct contact with the projecting portion 41 in the upper end part of the sidewall part 25b of the rear frame 25 even when it comes in direct contact with the part of the upper end part of the rear frame 25 except for the projecting portion 41.

Figure 5:
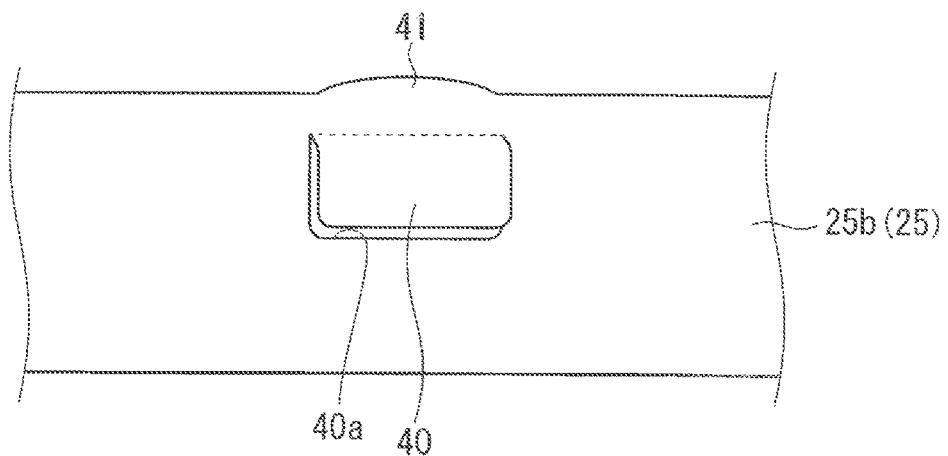
FIG. 5 is a drawing for describing an example of a shape of a fitting claw.
Figure 6:
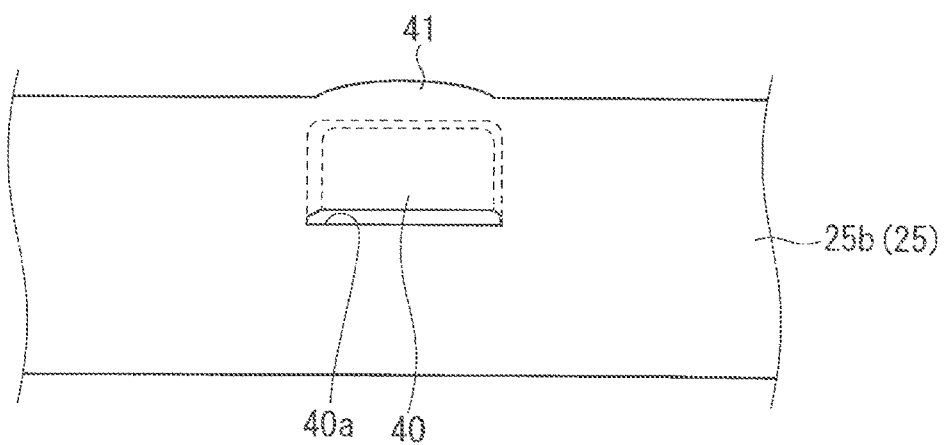
FIG. 6 is a drawing for describing the other example of the shape of the fitting claw.

Although the shape of the fitting claw 40 is not described in detail above, two shapes described hereinafter, for example, may be considered as the shape of the fitting claw 40. FIG. 5 is a drawing for describing an example of the shape of the fitting claw 40, and FIG. 6 is a drawing for describing the other example of the shape of the fitting claw 40. Each of FIG. 5 and FIG. 6 is a front view of the fitting claw 40.

As illustrated in FIG. 5, the fitting claw 40 is formed to be raised to a near side of the drawing with respect to a U-shaped cutout 40a formed in the sidewall part 25b. The base end of the fitting claw 40 is linearly formed, and the projecting portion 41 which forms a minute deformation is formed in the peripheral part of the base end of the fitting claw 40 in the rear frame 25, in some cases. The base end of the fitting claw 40 is illustrated by a dotted line in FIG. 5.

Alternatively, as illustrated in FIG. 6, the fitting claw 40 may also be formed to be raised to bulge toward the near side of the drawing with respect to a linear cutout 40a formed in the sidewall part 25b. Although it is described above that the cutout 40a has the linear shape, the cutout 40a actually has an arched shape slightly bulging toward the near side when viewed from a lower side along the sidewall part 25b. The base end of the fitting claw 40 is formed to have an inverted U shape, and the projecting portion 41 which forms a minute deformation is formed in the peripheral part of the base end of the fitting claw 40 in the rear frame 25, in some cases.

As described above, the liquid crystal display device 100 according to the embodiment 1 includes the relief part forming the clearance between the peripheral part of the base end of the fitting claw 40 in the upper end part of the rear frame 25 and the part of the middle frame 21 facing the peripheral part. Moreover, the projecting portion 41 projecting toward the middle frame 21 is formed in the peripheral part of the base end of the fitting claw 40 in the upper end part of the rear frame 25, and the relief part avoids the direct contact between the middle frame 21 and the projecting portion 41.

Accordingly, even when the projecting portion 41 projecting toward the middle frame 21 occurs in the peripheral part of the base end of the fitting claw 40 in the upper end part of the rear frame 25, the direct contact of the projecting portion 41 with the middle frame 21 can be suppressed. Since the direct contact of the projecting portion 41 with the middle frame 21 due to the influence of the oscillation or impact, for example, is suppressed, the abrasion of the projecting portion 41 of the rear frame 25 or the middle frame 21 and the occurrence of shavings can be suppressed.

The liquid crystal display device 100 further includes a liquid crystal display panel 1 and the backlight 2 for irradiating the liquid crystal display panel 1 from the back surface. The rear frame 25 is the frame for housing the members constituting the backlight 2, and the middle frame 21 is the frame for mounting the liquid crystal display panel 1. The fitting claw 40 is fitted with the fitting hole 30, thus the backlight member and the rear frame 25 are attached to the middle frame 21.

Accordingly, the above configuration can suppress the defect that the foreign particle caused by the abrasion in manufacturing the liquid crystal display device 100 or in using the product moves between the backlight 2 and the liquid crystal display panel 1, thereby causing the display defect, so that the quality of the liquid crystal display device 100 can be enhanced. Furthermore, since the occurrence of the rework operation for removing the foreign particle can be suppressed, productivity can be enhanced.

The relief part is the concave portion 31 provided in the part of the middle frame 21 facing the peripheral part of the base end of the fitting claw 40. That is to say, the relief part is provided in the part of the middle frame 21 facing the part where the projecting portion 41 is formed. Accordingly, the direct contact of the projecting portion 41 with the middle frame 21 can be easily suppressed by adjusting the depth and region of the concave portion 31 with an assumption of the projecting amount of the projecting portion 41 which is accidentally formed and the region where the projecting portion 41 is formed.

The middle frame 21 is formed using the resin material, and the concave portion 31 is provided in the middle frame 21, so that the concave portion 31 can be easily formed by changing a design of the mold, for example. Moreover, the occurrence of the foreign particle caused by the abrasion in the middle frame 21 made of the resin, in which the abrasion easily occurs due to the contact with the metal and thus the foreign particle occurs easily, can be effectively suppressed.

The middle frame 21 has the fitting hole 30, and the fitting claw 40 of the rear frame 25 is fitted with the fitting hole 30 of the middle frame 21 to constitute the frame structure, thus the middle frame 21 and the rear frame 25 can be stably fixed to each other.

Embodiment 2

Figure 7:
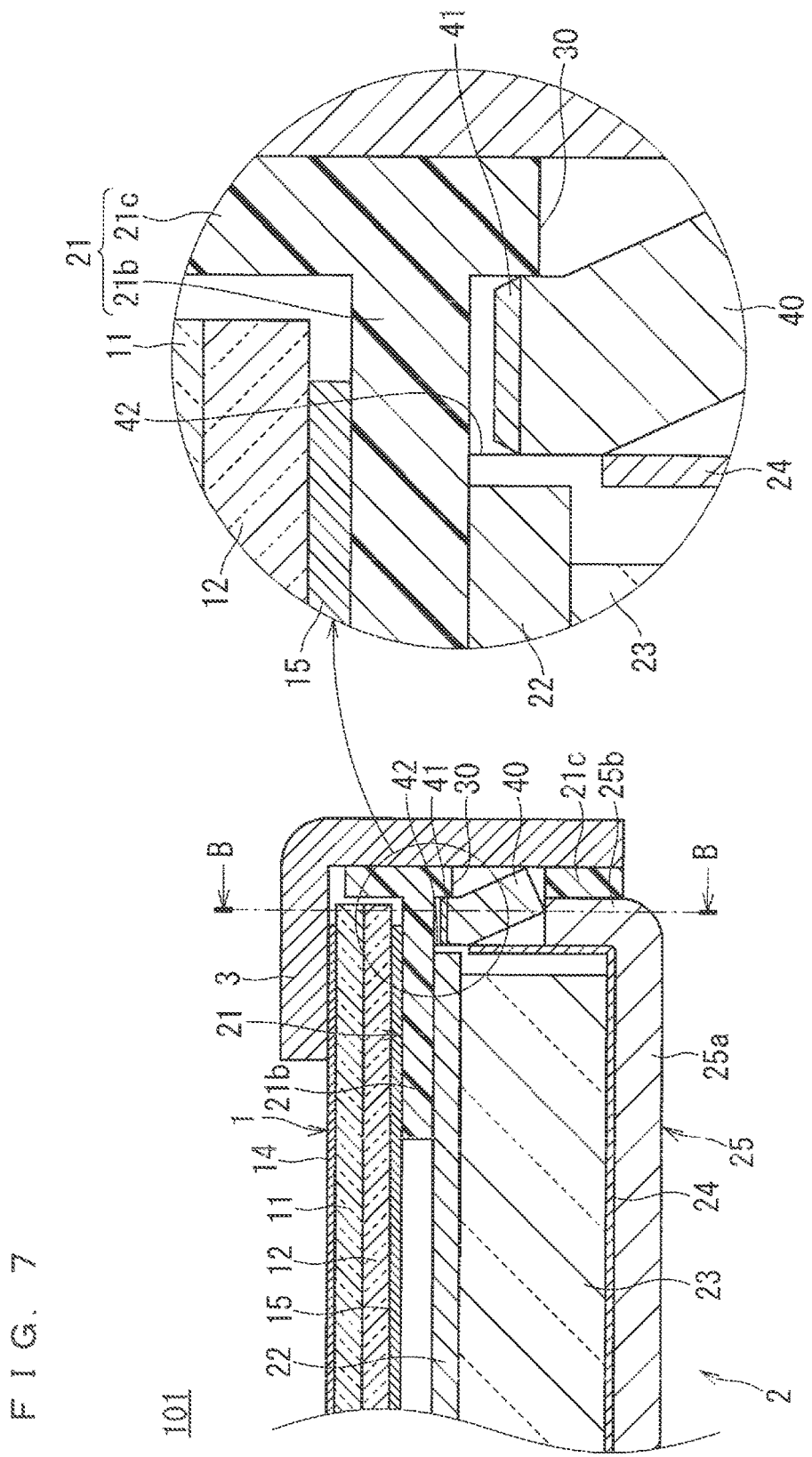
FIG. 7 is a partial cross sectional view of a liquid crystal display device according to an embodiment 2 and its enlarged view.
Figure 8:
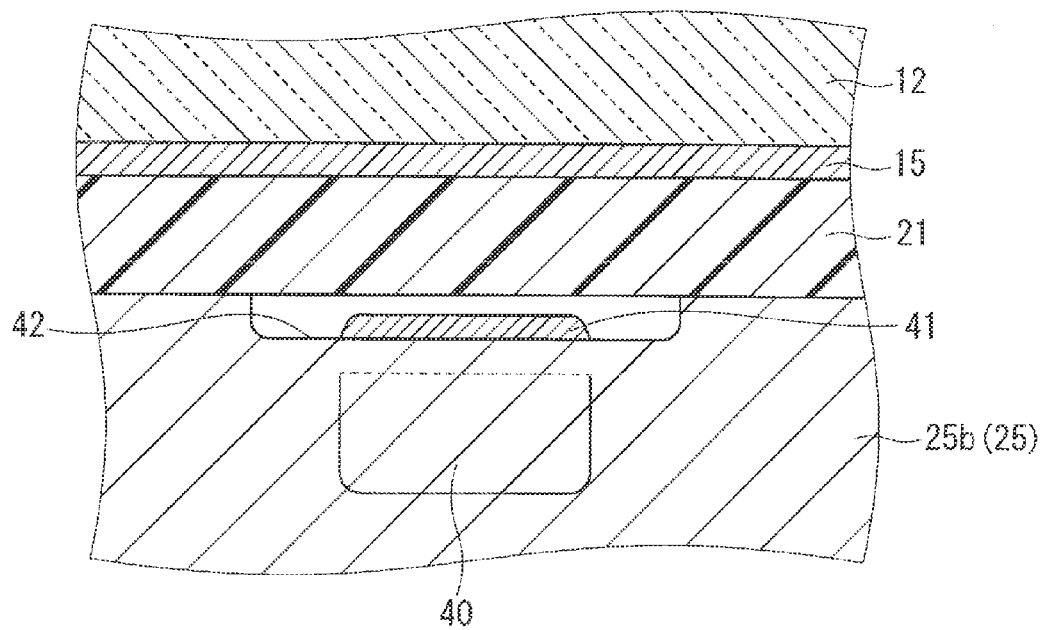
FIG. 8 is a cross sectional view along a B-B line of FIG. 7.

Next, a liquid crystal display device 101 according to the embodiment 2 is described. FIG. 7 is a partial cross sectional view of the liquid crystal display device 101 according to the embodiment 2 and its enlarged view, and is a drawing schematically illustrating the partial cross section of the liquid crystal display device 101. FIG. 8 is a cross sectional view along a B-B line of FIG. 7. In the embodiment 2, the same reference numerals as those described in the embodiment 1 will be assigned to the same constituent element and the description thereof will be omitted.

As illustrated in FIG. 7 and FIG. 8, in the embodiment 2, a concave portion 42 as a relief part is not provided in the middle frame 21 but is provided in the peripheral part of the base end of the fitting claw 40 in the rear frame 25. That is to say, the concave portion 42 is formed in the part of the rear frame 25 where the projecting portion 41 is formed so as to dent on an opposite side of the middle frame 21. Accordingly, the concave portion 42 functions as a relief part forming a clearance between the peripheral part of the base end of the fitting claw 40 in the upper end part of the rear frame 25 and the part in the middle frame 21 facing the peripheral part. Such a formation of the clearance enables an increase in a distance between the middle frame 21 and the projecting portion 41. A depth of the concave portion 42 is formed larger than a projection amount of the projecting portion 41 from the base end to a tip thereof. The concave portion 42 is formed in a region wider than a region where the projecting portion 41 is formed.

Considered herein is a case where the fitting hole 30 and the fitting claw 40 provided in the middle frame 21 and the rear frame 25, respectively, are fitted with each other to constitute the backlight 2. Since the concave portion 42 is provided in the rear frame 25 as the relief part, the part of the middle frame 21 facing the upper end part of the rear frame 25 does not come in direct contact with the projecting portion 41 in the upper end part of the rear frame 25 even when it comes in direct contact with the part of the upper end part of the rear frame 25 except for the projecting portion 41.

As described above, in the liquid crystal display device 101 according to the embodiment 2, the relief part is the concave portion 42 provided in the peripheral part of the base end of the fitting claw 40 in the rear frame 25. That is to say, the relief part is provided in the part of the rear frame 25 where the projecting portion 41 is formed. Accordingly, the direct contact of the projecting portion 41 with the middle frame 21 can be easily suppressed by adjusting the depth and region of the concave portion 42 with an assumption of the projecting amount of the projecting portion 41 which is accidentally formed and the region where the projecting portion 41 is formed.

Since the concave portion 42 is provided in the rear frame 25, the concave portion 42 can be formed in the accurate position in the peripheral part of the base end of the fitting claw 40 where the projecting portion 41 is formed.

Another Modification Example

The embodiments 1 and 2 do not clearly specify whether the middle frame 21 and the upper end part of the rear frame 25 are constantly in direct contact with each other or intermittently come in direct contact with each other in case of oscillation, for example. However, since the projecting portion 41 is not in direct contact with the middle frame 21 in the configuration that the middle frame 21 may come in direct contact with the upper end part of the rear frame 25, the occurrence of the foreign particle can be suppressed. Herein, the configuration that the middle frame 21 may come in direct contact with the upper end part of the rear frame 25 indicates the configuration that the middle frame 21 is continually in direct contact with the upper end part of the rear frame 25 or the configuration that the middle frame 21 is not continually in direct contact with the upper end part of the rear frame 25 but may intermittently come in direct contact with the upper end part of the rear frame 25 in case of oscillation, for example.

In the meanwhile, when the middle frame 21 and the upper end part of the rear frame 25 are constantly in direct contact with each other, that is to say, when the part of the middle frame 21 facing the upper end part of the rear frame 25 is in direct contact with the part of the upper end part of the rear frame 25 except for the peripheral part of the base end of the fitting claw 40 and is not in direct contact with the peripheral part in the upper end part of the rear frame 25, a backlash between the middle frame 21 and the rear frame 25 is suppressed, thus the frame structure that the middle frame 21 and the rear frame 25 are stably fixed to each other can be obtained.

The embodiments 1 and 2 describes the case where the projecting portion 41 projecting toward the middle frame 21 is formed in the peripheral part of the base end of the fitting claw 40 in the upper end part of the rear frame 25, however, the projecting portion 41 is not always formed in all of the products depending on a production tolerance. Even in such a case, regardless of the presence or absence of the projecting portion 41, preferable is the design of providing the concave portions 31 and 42 as the relief part for suppressing the direct contact of the projecting portion 41 with the middle frame 21 in a state where the projecting portion 41 occurs in terms of a margin design.

According such a design, an effect of suppressing the occurrence of the foreign particle and an effect of enhancing the productivity can be obtained in the product in which the projecting portion 41 is formed due to the product tolerance, for example. Particularly, since the product can be manufactured through the same design regardless of whether or not the projecting portion 41 is formed due to the product tolerance, for example, the production efficiency is increased. That is to say, the effect described above is not limited to the product in which the projecting portion 41 is formed.

In the embodiments 1 and 2, the concave portions 31 and 42 as the relief part are partially formed in the peripheral part of the base end of the fitting claw 40 in the rear frame 25 or the part of the middle frame 21 facing the peripheral part, however, the forming region of the concave portions 31 and 42 may be larger to some extent than the region where the projecting portion 41 is formed. That is to say, the forming region of the concave portions 31 and 42 may be larger than the region illustrated in FIG. 3, FIG. 4, FIG. 7, and FIG. 8.

It is described that the middle frame 21 and the upper end part of the rear frame 25 are in direct contact with each other except for the forming region of the concave portions 31 and 42, thereby the backlash between the middle frame 21 and the rear frame 25 is suppressed, thus the frame structure that the middle frame 21 and the rear frame 25 are stably fixed to each other can be obtained. However, the part of the upper end part of the rear frame 25 coming in direct contact with the middle frame 21 needs not extend across the whole upper end part of the rear frame 25 except for the forming region of the concave portions 31 and 42.

Figure 9:
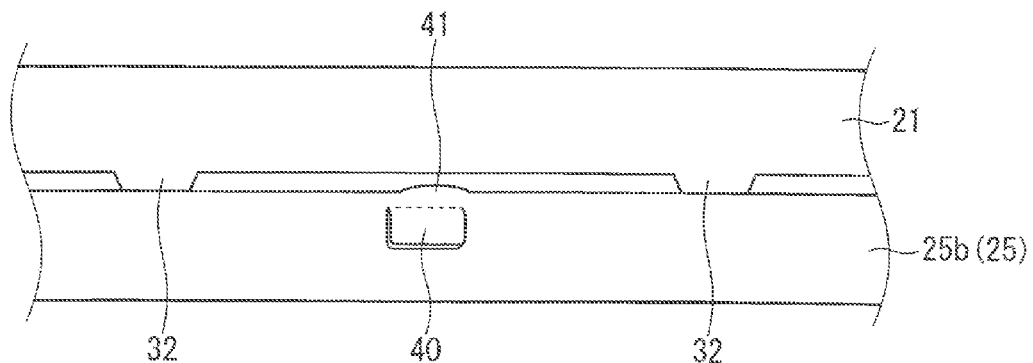
FIG. 9 is a side view illustrating an example of a peripheral part of the fitting claw of the liquid crystal display device according to a modification example of the embodiments 1 and 2.

For example, as illustrated in FIG. 9, two convex portions 32 which project toward the rear frame 25 to be in direct contact with the upper end part of the rear frame 25 may be provided in the upper wall part 21b of the middle frame 21 with the peripheral part of the base end of the fitting claw 40 in the upper end part of the rear frame 25 therebetween. The relief part is a clearance provided in the region between the two convex portions 32. FIG. 9 is a side view illustrating an example of the peripheral part of the fitting claw 40 of the liquid crystal display device according to the modification example of the embodiments 1 and 2. Although the two convex portions 32 are in direct contact with the upper end part of the rear frame 25, the middle frame 21 is not in direct contact with the rear frame 25 but has a clearance different from the relief part in an outer side of the convex portions 32.

Even in such a configuration, the effect of suppressing the occurrence of the foreign particle by reason that the projecting portion 41 is not in direct contact with the middle frame 21 and the effect that the backlash between the middle frame 21 and the rear frame 25 is suppressed and the frame structure that the middle frame 21 and the rear frame 25 are stably fixed to each other can be obtained.

Figure 10:
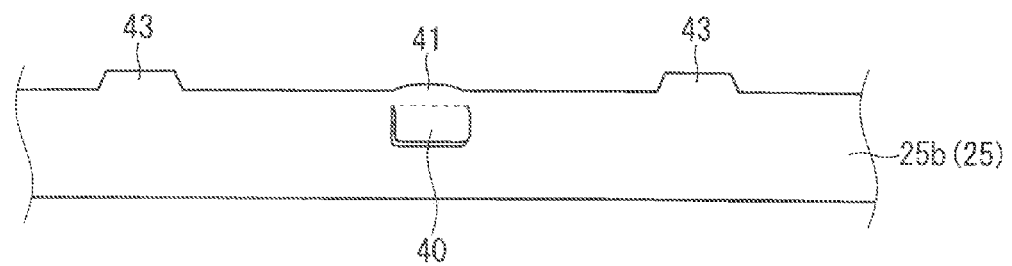
FIG. 10 is a side view illustrating the other example of the peripheral part of the fitting claw of the liquid crystal display device according to a modification example of the embodiments 1 and 2.

Alternatively, for example, as illustrated in FIG. 10, two convex portions 43 which project toward the middle frame 21 to be in direct contact with the middle frame 21 may be provided in the upper end part of the rear frame 25 with the peripheral part of the base end of the fitting claw 40 in the upper end part of the rear frame 25 therebetween. The relief part is a clearance provided in the region between the two convex portions 43. FIG. 10 is a side view illustrating the other example of the peripheral part of the fitting claw 40 of the liquid crystal display device according to the modification example of the embodiments 1 and 2. The illustration of the middle frame 21 is omitted in FIG. 10. Although the two convex portions 43 are in direct contact with the lower end of the middle frame 21, the middle frame 21 is not in direct contact with the rear frame 25 but has a clearance different from the relief part in an outer side of the convex portions 43.

Even in such a configuration, the effect of suppressing the occurrence of the foreign particle by reason that the projecting portion 41 is not in direct contact with the middle frame 21 and the effect that the backlash between the middle frame 21 and the rear frame 25 is suppressed and the frame structure that the middle frame 21 and the rear frame 25 are stably fixed to each other can be obtained.

In the case of FIG. 9 and FIG. 10, the sizes of the convex portions 32 and 43, more specifically, the area being in direct contact with the rear frame 25 or the middle frame 21 disposed to face the convex portions 32 and 43 is small, concerned is that a stress is concentrated in the part being in direct contact with the rear frame 25 or the middle frame 21 disposed to face the convex portions 32 and 43, thereby causing the occurrence of the foreign particle in the direct contact part. Accordingly, it is preferable to design the sizes of the convex portions 32 and 43 to be relatively large to prevent the concentration of the stress and design the direct contact part to be at least flat. Although it is described that the two of each of the convex portions 32 and 43 are provided in FIG. 9 and FIG. 10, the convex portions 32 and 43 may be provided further outer side. That is to say, three of each of the convex portions 32 and 43 may also be provided.

Although the modification example is described in view of suppressing the occurrence of the foreign material, preferable is the configuration of providing the concave portions 31 and 42 in the peripheral part of the base end of the fitting claw 40 in the rear frame 25 or the part of the middle frame 21 facing the peripheral part, respectively, as in the case of the embodiments 1 and 2 in view of suppressing the occurrence of the foreign material.

The embodiments 1 and 2 describe the case where the fitting claw 40 of the rear frame 25 housing the backlight member is fitted with the fitting hole 30 of the middle frame 21 mounting the liquid crystal display panel 1 to attach the backlight member and the rear frame 25 to the middle frame 21 as the example. The above configuration is described as the most preferable example, because in the above configuration, when the projecting portion 41 comes in direct contact with the middle frame 21 and causes the occurrence of the foreign particle, the foreign particles easily moves between the backlight 2 and the liquid crystal display panel 1, thereby causing the display defect, however, the configuration is not limited thereto. For example, when the frame structure similar to the case of the embodiments 1 and 2 is applied to each frame constituting the liquid crystal display device, the occurrence of the foreign particle can be suppressed by providing the relief part.

The embodiments 1 and 2 describe the case where the concave portion is provided in either the middle frame 21 or the rear frame 25, and the fitting claw 40 provided in the rear frame 25 is fitted with the fitting hole 30 provided in the middle frame 21 as the example, however, the frame in which the concave portion is provided may be different from the frame in which the fitting hole is provided.

Figure 11:
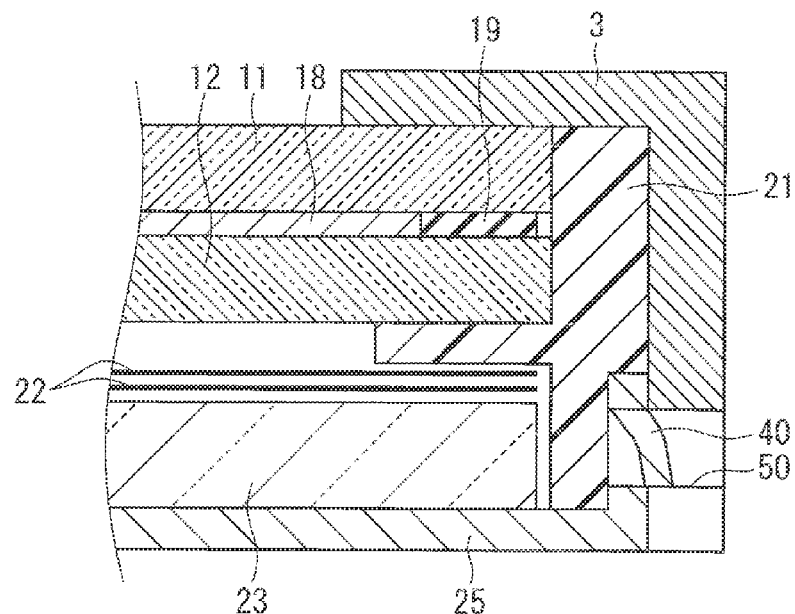
FIG. 11 is a partial cross sectional view illustrating an example of a frame structure of the liquid crystal display device according to a modification example of the embodiments 1 and 2.
Figure 12:
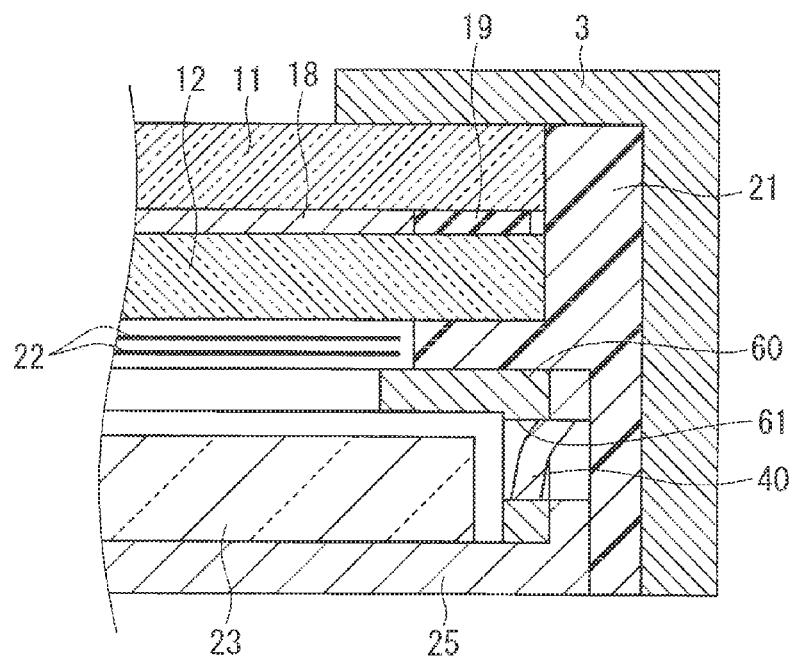
FIG. 12 is a partial cross sectional view illustrating the other example of the frame structure of the liquid crystal display device according to a modification example of the embodiments 1 and 2.

Described using FIG. 11 and FIG. 12 is a specific example of a case where the frame in which the concave portion is provided is different from the frame in which the fitting hole is provided. FIG. 11 is a partial cross sectional view illustrating an example of a frame structure of the liquid crystal display device according to the modification example of the embodiments 1 and 2. FIG. 12 is a partial cross sectional view illustrating the other example of the frame structure of the liquid crystal display device according to the modification example of the embodiments 1 and 2. FIG. 11 and FIG. 12 which illustrate a liquid crystal 18 and a spacer 19 are described under a condition where FIG. 11 and FIG. 12 correspond to the cross sectional view in FIG. 3, for example. Although the concave portion is not illustrated in FIG. 11 and FIG. 12, the concave portion is actually provided in either the middle frame 21 or the rear frame 25 in a manner similar to the case of the embodiments 1 and 2.

As illustrated in FIG. 11, a fitting hole 50 is provided in a sidewall part of the front frame 3. The fitting claw 40 of the rear frame 25 is provided to project toward an outer surface. The fitting claw 40 of the rear frame 25 is fitted with the fitting hole 50 of the front frame 3, thus the middle frame 21, the backlight member, and the rear frame 25 are attached to the front frame 3. Since the middle frame 21 is located between the rear frame 25 and the front frame 3, the base end of the fitting claw 40 in the upper end part of the rear frame 25 is in direct contact with the middle frame 21. In the above case also, the effect of suppressing the occurrence of the foreign particle can be obtained by providing the concave portion in the peripheral part of the base end of the fitting claw 40 in the rear frame 25 or the part of the middle frame 21 facing the peripheral part.

Alternatively, a front frame for backlight 60 is located between the rear frame 25 and the middle frame 21 as illustrated in FIG. 12. A fitting hole 61 is provided in the front frame for backlight 60. The fitting claw 40 of the rear frame 25 is provided to project toward an inner surface. The fitting claw 40 of the rear frame 25 is fitted with the fitting hole 61 of the front frame for backlight 60, thus the backlight member and the rear frame 25 are attached to the front frame for backlight 60. The base end of the fitting claw 40 in the upper end part of the rear frame 25 is in direct contact with the middle frame 21. In the above case also, the effect of suppressing the occurrence of the foreign particle can be obtained by providing the concave portion in the peripheral part of the base end of the fitting claw 40 in the rear frame 25 or the part of the middle frame 21 facing the peripheral part.

In FIG. 11 and FIG. 12, the middle frame 21 is sandwiched between the rear frame 25 and the front frame 3, thereby being aligned and fixed in the end surface of the rear frame 25 and the front frame 3. Alternatively, also applicable is a configuration that a fitting claw or a fitting hole is formed in at least one of the rear frame 25 and the front frame 3 in a part except for a cross sectional part illustrated in FIG. 11 and FIG. 12, and a fitting hole or a fitting claw to be fitted with the fitting claw or the fitting hole described above is formed in the middle frame 21, thus the middle frame 21 is aligned and fixed.

In the embodiments 1 and 2, the case of using the middle frame 21 formed of the resin material is described by reason that it is easily abraded by the contact with the metal and the foreign particle caused by the abrasion of the resin easily occurs, thus the effect of the embodiments 1 and 2 is effectively exerted particularly. The configuration of forming the concave portion 31 in the middle frame 21 as in the case of the embodiment 1 has an advantage that the concave portion 31 can be easily formed by using the middle frame 21, which is formed of the resin material, and changing the design of the mold at the time of molding the resin, for example.

However, even when the middle frame 21 is formed of the other material, the projecting portion 41 projecting from the upper end part of the rear frame 25, which is formed of the metal material, and the middle frame 21 come in direct contact with and rubs against each other, thus at least one member is abraded and the foreign particle easily occurs in the manner similar to the configuration described above. Accordingly, a material other than the resin may be selected as a material of the middle frame 21, and also in this case, the effect of suppressing the occurrence of the foreign particle due to the direct contact between the frames constituting the liquid crystal display device can be obtained.

According to the present invention, the above embodiments can be arbitrarily combined, or each embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device, comprising:
a first frame being made of a metal and having an upper surface and a fitting claw, for being fitted with an other component, which is formed by cutting and raising a part of a sidewall part from an upper end part side to project toward one surface side of said sidewall part, said fitting claw having a base end in said upper end part of said first frame, said base end including a peripheral part having a surface and a projecting portion projecting from a portion of said surface;
a second frame being disposed to face an upper end part of said first frame, and having a lower surface that contacts said upper surface of said first frame such that said projecting portion projects toward said second frame and said surface of said peripheral part faces said second frame; and
a relief part forming a clearance between said peripheral part of said base end of said fitting claw and a part of said second frame facing said peripheral part, such that said surface of said peripheral part is exposed in said relief part and said projecting portion extends into said relief part.

2. The liquid crystal display device according to claim 1, wherein
said relief part is a concave portion provided in said peripheral part of said base end of said fitting claw in said first frame or a part of said second frame facing said peripheral part.

3. The liquid crystal display device according to claim 1, wherein
two convex portions located in one of said upper end part of said first frame and said second frame and being in direct contact with other one of said upper end part of said first frame and said second frame are provided with said peripheral part of said base end of said fitting claw in said upper end part of said first frame therebetween, and
said relief part is provided in a region between said two convex portions.

4. The liquid crystal display device according to claim 1, wherein
said relief part avoids a direct contact between said second frame and said projecting portion.

5. The liquid crystal display device according to claim 4, wherein
said relief part is provided in a part of said first frame where said projecting portion is formed or a part of said second frame facing a part where said projecting portion is formed.

6. The liquid crystal display device according to claim 1, wherein
said part of said second frame facing said upper end part of said first frame is in direct contact with a part of said first frame except for said peripheral part of said base end of said fitting claw in said upper end part of said first frame and is not in direct in contact with said peripheral part in said upper end part of said first frame.

7. The liquid crystal display device according to claim 2, wherein
said second frame is formed using a resin material, and said concave portion is provided in said second frame.

8. The liquid crystal display device according to claim 2, wherein
said concave portion is provided in said first frame.

9. The liquid crystal display device according to claim 1, wherein
said second frame has a fitting hole, and
said fitting claw of said first frame is fitted with said fitting hole of said second frame to constitute a frame structure.

10. The liquid crystal display device according to claim 9, wherein
said liquid crystal display device further comprises a liquid crystal display panel and a backlight irradiating said liquid crystal display panel from a back surface,
said first frame is a frame for housing a member constituting said backlight,
said second frame is a frame for mounting said liquid crystal display panel, and
said fitting claw is fitted with said fitting hole, thus said member constituting said backlight and said first frame is attached to said second frame.

11. A liquid crystal display device, comprising:
a first frame being made of a metal and having a fitting claw, for being fitted with an other component, which is formed by cutting and raising a part of a sidewall part from an upper end part side to project toward one surface side of said sidewall part;
a second frame being disposed to face an upper end part of said first frame; and
a relief part forming a clearance between a peripheral part of a base end of said fitting claw in said upper end part of said first frame and a part of said second frame facing said peripheral part,
wherein said relief part is a concave portion provided in said peripheral part of said base end of said fitting claw in said first frame or a part of said second frame facing said peripheral part,
said part of said second frame facing said upper end part of said first frame is in direct contact with a part of said first frame except for said peripheral part of said base end of said fitting claw in said upper end part of said first frame and is not in direct in contact with said peripheral part in said upper end part of said first frame in said relief part.

12. The liquid crystal display device according to claim 11, wherein
a projecting portion projecting toward said second frame is formed in said peripheral part of said base end of said fitting claw in said upper end part of said first frame, and
said relief part avoids a direct contact between said second frame and said projecting portion.

13. The liquid crystal display device according to claim 12, wherein
said relief part is provided in a part of said first frame where said projecting portion is formed or a part of said second frame facing a part where said projecting portion is formed.

14. The liquid crystal display device according to claim 11, wherein
said second frame is formed using a resin material, and said concave portion is provided in said second frame.

15. The liquid crystal display device according to claim 11, wherein said second frame has a fitting hole, and said fitting claw of said first frame is fitted with said fitting hole of said second frame to constitute a frame structure, said liquid crystal display device further comprises a liquid crystal display panel and a backlight irradiating said liquid crystal display panel from a back surface, said first frame is a frame for housing a member constituting said backlight, said second frame is a frame for mounting said liquid crystal display panel, and said fitting claw is fitted with said fitting hole, thus said member constituting said backlight and said first frame is attached to said second frame.

16. A liquid crystal display device, comprising:

a first frame being made of a metal and having a fitting claw, for being fitted with an other component, which is formed by cutting and raising a part of a sidewall part from an upper end part side to project toward one surface side of said sidewall part;

a second frame being disposed to face an upper end part of said first frame; and a relief part forming a clearance between a peripheral part of a base end of said fitting claw in said upper end part of said first frame and a part of said second frame facing said peripheral part, wherein two convex portions located in one of said upper end part of said first frame and said second frame and being in direct contact with other one of said upper end part of said first frame and said second frame are provided with said peripheral part of said base end of said fitting claw in said upper end part of said first frame therebetween, and said relief part is provided in a region between said two convex portions, said part of said second frame facing said upper end part of said first frame is in direct contact with a part of said first frame except for said peripheral part of said base end of said fitting claw in said upper end part of said first frame and is not in direct in contact with said peripheral part in said upper end part of said first frame in said relief part.

17. The liquid crystal display device according to claim 16, wherein a projecting portion projecting toward said second frame is formed in said peripheral part of said base end of said fitting claw in said upper end part of said first frame, and said relief part avoids a direct contact between said second frame and said projecting portion.

18. The liquid crystal display device according to claim 17, wherein said relief part is provided in a part of said first frame where said projecting portion is formed or a part of said second frame facing a part where said projecting portion is formed.

19. The liquid crystal display device according to claim 16, wherein said second frame is formed using a resin material, and said concave portion is provided in said second frame.

20. The liquid crystal display device according to claim 16, wherein said second frame has a fitting hole, and said fitting claw of said first frame is fitted with said fitting hole of said second frame to constitute a frame structure, said liquid crystal display device further comprises a liquid crystal display panel and a backlight irradiating said liquid crystal display panel from a back surface, said first frame is a frame for housing a member constituting said backlight, said second frame is a frame for mounting said liquid crystal display panel, and said fitting claw is fitted with said fitting hole, thus said member constituting said backlight and said first frame is attached to said second frame.

* * * * *